United States Patent [19]
Harold

[11] 3,960,401
[45] June 1, 1976

[54] VEHICLE TRANSPORT TRAILER

[76] Inventor: Billy E. Harold, 6869 Oldham, Taylor, Mich. 48180

[22] Filed: July 25, 1974

[21] Appl. No.: 491,811

[52] U.S. Cl. .............................. 296/1 A; 105/368 R
[51] Int. Cl.² ........................................... B60P 3/08
[58] Field of Search ................. 296/1 A; 105/368 R

[56] References Cited
UNITED STATES PATENTS

| | | | |
|---|---|---|---|
| 2,750,225 | 6/1956 | Mettetal | 296/1 A |
| 3,099,230 | 7/1963 | DePodesta | 296/1 A |
| 3,104,127 | 9/1963 | Swartzwelder | 296/1 A |
| 3,690,717 | 9/1972 | Taylor | 296/1 A |

*Primary Examiner*—Robert G. Sheridan
*Attorney, Agent, or Firm*—Harry R. Dumont

[57] ABSTRACT

A vehicle transport trailer including a low bed trailer capable of transporting a load of seven full size station wagons and sedans, a load of five pick-up trucks and one intermediate size sedan, a load of ten sub-compact size cars and a broad variety of mixed loads of pick-up trucks, vans, intermediate size sedans, full size sedans, sub-compact and the like cars. The vehicle transport trailer relates to a load of automotive vehicles which are carried entirely within the limits and confines of the self-contained trailer structure without requiring storage of any vehicle on or above the tractor used to draw the trailer. The several embodiments of the invention are made possible by particular specialized track and track elevating mechanism constructions, and in some cases by a particular orientation of the loaded and carried vehicles with a loading sequence related to their relative positions on the trailer.

11 Claims, 19 Drawing Figures

VEHICLE TRANSPORT TRAILER

REFERENCE TO RELATED APPLICATION

This application is related to my copending U.S. application Ser. No. 452,237 filed on Mar. 18, 1974 for "Vehicle Transport Trailer", now abandoned.

BACKGROUND OF THE INVENTION

This invention relates to a vehicle transport trailer of the self-contained type and more particularly to a tractor-trailer unit capable of hauling a broad variety of vehicle mixes and loadings without the need for carrying or loading an additional vehicle over the tractor cab. The present invention makes it possible to use a relatively large variety of standard commercial tractors to draw the trailer. The entire unit may have a maximum length of, for example, 55 feet with a 5 foot overhang so as to conform with essentially all of the various state laws which provide maximum length and height limitations for transport vehicles, particularly vehicles used for hauling automotive vehicles. The height limitation further provided in most states is that the maximum height is 13 ½ feet.

A major advantage of the present invention, as it will be clarified hereinafter, is that it greatly improves the safety factor with respect to enlarging the driver's field of vision since in the cab he is enabled to see farther in all directions of traffic. There is required no overhead and bracing structure to carry a vehicle over the cab itself in such manner as might obscure the driver's vision.

A still further outstanding advantage of the present invention is that the trailer is of the self-contained type so that it is possible to use a standard highway trailer of either the high tilt type or of the conventional lower profile type which can be switched from trailer to trailer independently of the particular vehicle trailer being towed. This allows for a proper matching between the loading of vehicles and the power of the tractor used. This promotes fuel conservation, reduces the number of tractors needed to move a given number of vehicles over the highway, and thus reduces the exhaust emissions which serve to pollute the atmosphere.

A variety of vehicle transports are in current commercial use, most of which are subject to certain obvious shortcomings and disadvantages. An example of one such vehicle transport is shown and described in Stuart U.S. Pat. No. 3,589,767. The vehicle therein described is typical of many vehicle transports on the road today, in that one of the vehicles being transported must be carried on the forward ramp built over the cab, thus placing an overall limit on the size and power of the truck tractor used to haul the equipment.

A different vehicle transport system is shown and described in Stuart U.S. Pat. No. 3,343,865. This transport has similar problems with respect to requiring the loading and storage of a carried vehicle over the tractor cab and again requires an extension of the forward ramp and a costly modification of a standard tractor by incorporating that ramp.

A still further vehicle transport is shown and described in Taylor U.S. Pat. No. 3,690,717, which in a manner similar to the first mentioned patent requires storage of a transported vehicle over a custom modified tractor.

SUMMARY OF THE PRESENT INVENTION

The present invention relates to a transport trailer which is adaptable to be towed by any of a number of standard type tractors. The vehicle transport trailer may be characterized as having four tracks aligned longitudinally along the top of the trailer which are adjustable vertically at either or both ends. It includes three intermediate tracks and a pair of lower tracks, one fixed and one movable. The track arrangement allows loading with a maximum number of vehicles in the backed-on position. This feature is of advantage since unloading is frequently done at night and the unloading process is facilitated when the vehicle can be driven off from such a position that the headlights may be used.

The present invention further provides an advantage in that the intermediate set of three tracks is longitudinally aligned along the trailer length and tiltable about either end and movable between lower and upper positions. The combination of the above mentioned upper and intermediate tracks along with the fixed track and the hinged track in the bed of the trailer allows for a great variety of mixed vehicle loadings.

BRIEF DESCRIPTION OF THE DRAWINGS

A complete explanation of the present invention will be provided with reference to the accompanying specification and to the several drawings in which like parts are identified with like numerals where they appear in the several views, and wherein:

FIGS. 10 through 17 are side elevational views of a partially schematic type illustrating a number of mixed loadings of both commercial and passenger vehicles in which:

DETAILED DESCRIPTION

Figures 1, 2, 3, 4, 5:
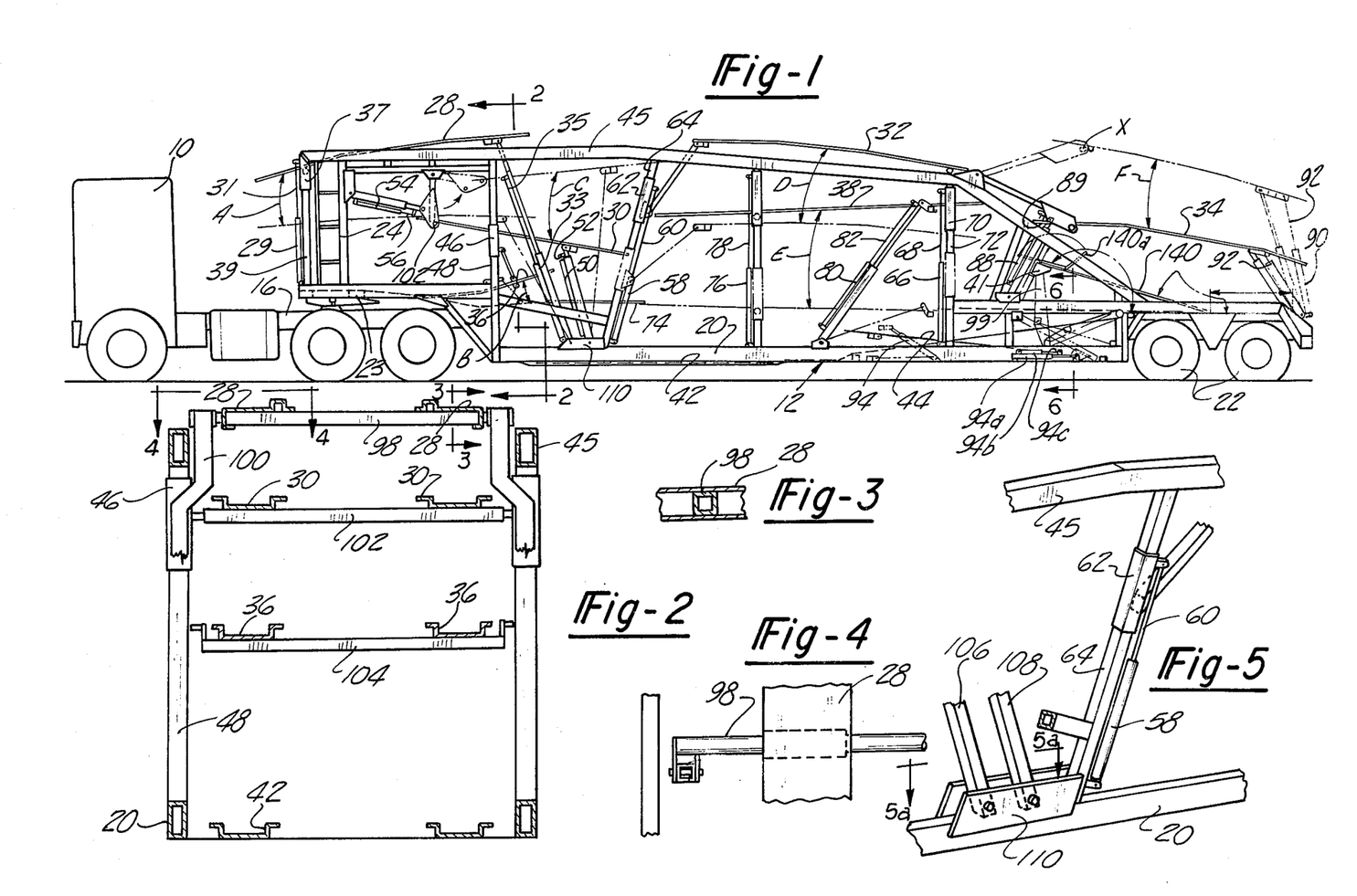
FIG. 1 is a side elevational view of a vehicle transport trailer incorporating the present invention.
FIG. 2 is a vertical cross-sectional view along the section line 2—2 of FIG. 1.
FIG. 3 is an enlarged detailed section along the section line 3—3 of FIG. 2.
FIG. 4 is a fragmentary top plan view taken along the line 4—4 of FIG. 2.
FIG. 5 is a perspective view broken away in part and showing a portion of the upper track elevating mechanism.

The vehicle transport of the present invention is shown in its entirety together with the tractor of FIG. 1. It comprises a conventional tractor 10 of the tilt cab type and a trailer 12. The tractor 10 has a main frame 16 on which there is supported the forward end of the trailer 12. It will be understood that the trailer 12 is adapted to be hauled by any type of standard commercial tractor, either of the high or the low cab type. The trailer 12 further has a main frame 20 of the low bed or drop center type, the rear of which is supported by wheels 22, and the forward end of which is supported on the tractor 10 through a conventional king pin hookup mechanism 23. The trailer frame 20 supports a superstructure which includes a number of relatively spaced and like vertical side members 24, each being fabricated from rigid structural members and connected in a common vertical frame to form a truss-like load supporting structure of substantial vertical height and strength. The spaced side members 24 are interconnected at the bottom to the main frame 20 of the trailer 12. The trailer 12 includes a number of different and separately actuated tracks, certain of which are movable in predetermined sequence and manner as will be described hereinafter to provide a versatility of loading and of vehicle mix not possible with known vehicle transport systems. The several movable tracks are generally shown in their lowermost position in dash line form and in the uppermost position in solid line form. The upper four tracks are denoted by the numerals 28, 30, 32 and 34. The intermediate level tracks are denoted by the numerals 36, 38 and 140. It will be understood that there is included a further forward lower track 42 positioned in the bed of the trailer 12 and a second lower hinged track 44. A further track 140 may be included on the top of the wheel housing and having a flipper end 140a for adding to its length.

In each of the schematic drawings illustrating the different exemplary mixed vehicle loadings, that is in FIGS. 10 through 17, the vehicles carry a Roman numeral designation which shows the sequence in which they are loaded on the trailer 12. This sequence is, of course, sometimes critical with respect to the handling of the several tracks involved, particularly with respect to their elevating and lowering between the loading and carrying positions. Detailed descriptions will be given hereinafter for the representative loadings shown in FIGS. 10 through 12 which will also serve to clarify the different mixed loadings shown in the following FIGS. 13 through 17.

The movement of the four upper tracks 28, 30, 32 and 34 is generally vertical and is accomplished in each case through an associated hydraulic or pneumatic elevating mechanism. This mechanism includes with respect to track 28 a forward cylinder 29 and a piston rod 31. The arcuate path of travel of the forward end of the upper track 28 is designated by arrow A. A second cylinder 33 and piston rod 35 are connected to the rearward end of the track 28 with the two side track portions laterally supported and connected by cross members in a manner which will be better shown in FIG. 2 hereinafter. Responsive to the operation of the two above mentioned cylinder and piston combinations, the track 28 will be moved slidably and pivotably upward. This upward movement will provide sliding motion of a sleeve 37 which is slidably mounted and journaled on a vertical post 39, forming a part of the superstructure of the trailer 12. Each such vertical post is fixed at its upper end to a frame member 45 and at its lower end to the base 20 of the trailer 12.

It will be understood that during the loading process it is necessary in some cases to temporarily position skids in order to bridge spaces left intermediate the several different tracks or between the rearward end of the track 140 or 34 and ground so that the vehicles may be loaded.

It will be seen that the forwardmost intermediate track 36 is pivotally movable through the arc designated by the letter B between lower and upper positions through the operation of an associated hydraulic mechanism and a sleeve 46 that is vertically movable on an upstanding post 48. The movement of the track 36 is thus generally pivotable about its forward mounting.

The second upper track 30 is shown between its lower and upper positions with the path of arcuate movement being designated by the letter C. The movement of the track 30 is controlled through the operation of a cylinder 50 and a piston rod 52 at its rearward end, while the movement of the forward end of the track 30 is controlled through the operation of a second cylinder 54 and an associated rod 56.

The next upper track 32 is movable generally in the arcuate path designated by the letter D and is controlled in its movement through the operation of a cylinder 58 and a piston rod 60 and through a slidable sleeve 62 mounted on a further vertical post 64. The movement of the track 32 at its rearward end is controlled through a further cylinder 66 and rod 68 and through the upward and downward movement of a sleeve 70 journaled on a second vertical post 72.

The next intermediate track 38 is movable between the extreme positions shown through an arcuate path travel identified by the arrow E. It will be understood that wherever necessary a removable jumper skid, such as skid 74, is temporarily placed to bridge the tracks for loading or unloading. When not in use, the skid is removed to a storage position on the lower level of trailer 12. The movement of the track 38 is provided through the operation of a cylinder 76 and associated rod 78 at the forward end of the track 38, while the movement of its rearward end is provided through a cylinder 80 and associated rod 82. It is noted that there is provided a chain 86 which is normally fixed at its lower end and connectible at its upper end to provide for combined lifting as between the aligned pair of tracks 38 and 44 as will be better shown in FIGS. 8 and 8A hereinafter.

The rearward upper track 34 is movable between its extreme upper and lower positions arcuately through an arcuate path identified by the letter F. The movement at the forward end of the track 34 is provided through a cylinder 88 and associated rod 89, while the movement at the rear end of the track 34 is provided through a cylinder 90 and its rod 92.

Figure 15:
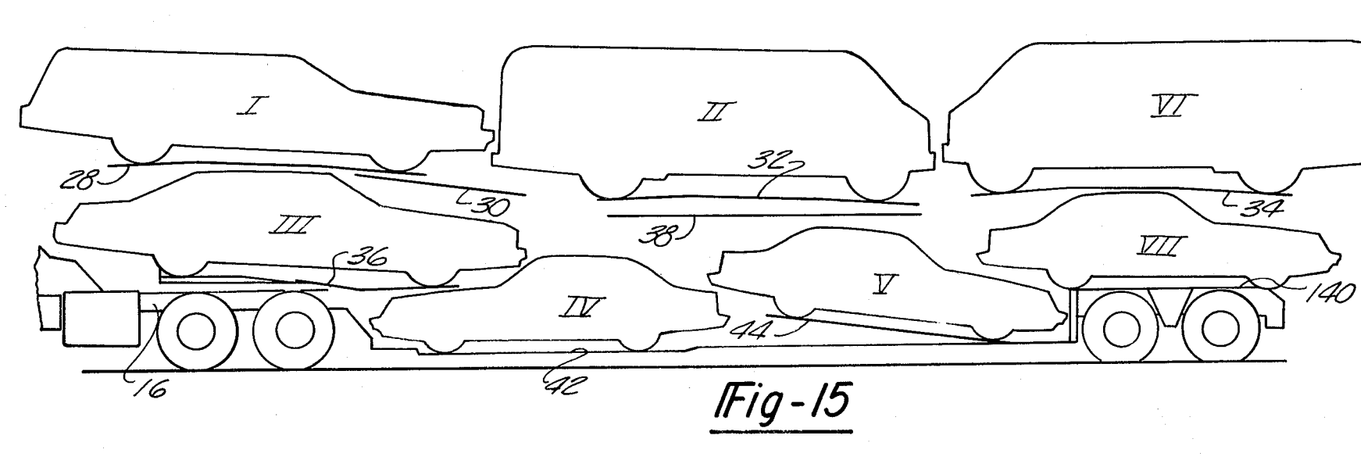
FIG. 15 shows a mixed load of two vans, one standard size station wagon, one full size car and three sub-compact cars.
Figure 16:
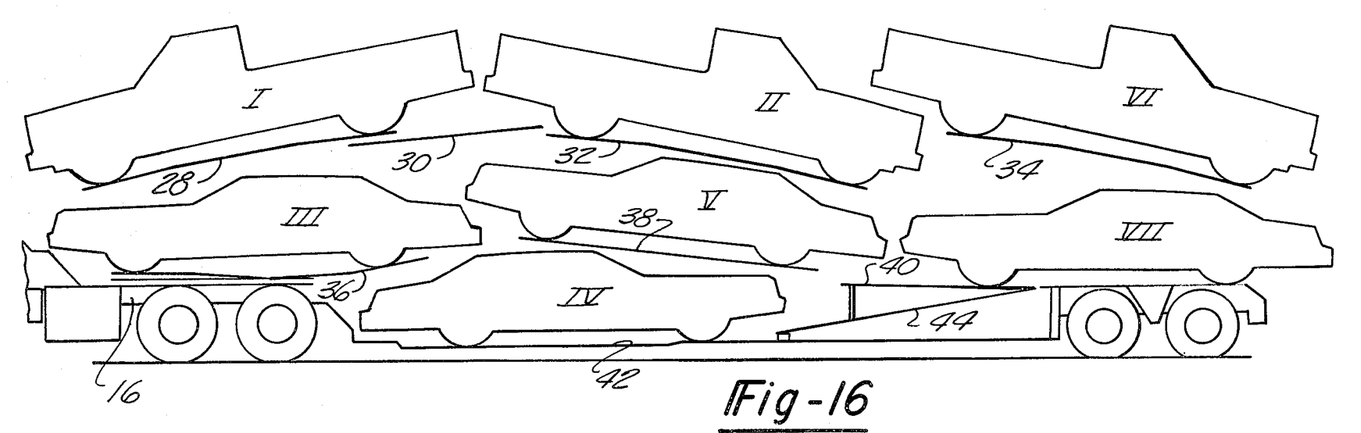
FIG. 16 shows a mixed load of three half-ton pick-up trucks and four intermediate size cars.

The lower track 44 is movable upwardly by a chain 86 at its forward and rearward end with the guidance of telescoping tubes 94 and 94a. Thus, the track 44 may be forwardly inclined as shown in the loading of FIG. 16 or, alternately, as shown in FIG. 15 rearwardly inclined in the loaded position. For certain loadings, such as those shown in FIG. 16, a further auxiliary track 40 is included.

FIGS. 2 through 5 are used to illustrate the general construction of the two side sections and actuators for each track. For example, in FIG. 2 there is shown the upper track 28 with its two side sections connection by a cross bar 98. The upper track 28 is supported for its pivotable movement on a pair of inwardly bent arms 100 which allow for movement within the side frames or upper rails 45 so that the maximum overall width of the trailer is not exceeded. Also shown is a portion of the second upper track 30 in which the separate track sections are likewise connected by a cross bar 102 to provide for a rigid unitary construction of the entire track section. Also shown is the front intermediate track 36 with its associated cross bar 104. Finally, mounted in the bed of the trailer 12, the fixed lower track 42 is shown. In FIG. 5, the pivotal mounting for the associated hydraulic cylinders 33 and 50 are provided by links 106 and 108, each of which is rotatively pinned at its lower end to an upstanding double-sided bracket 110 which is fixed by welding or riveting to the trailer base 20.

Figures 5A, 8, 8A, 9:
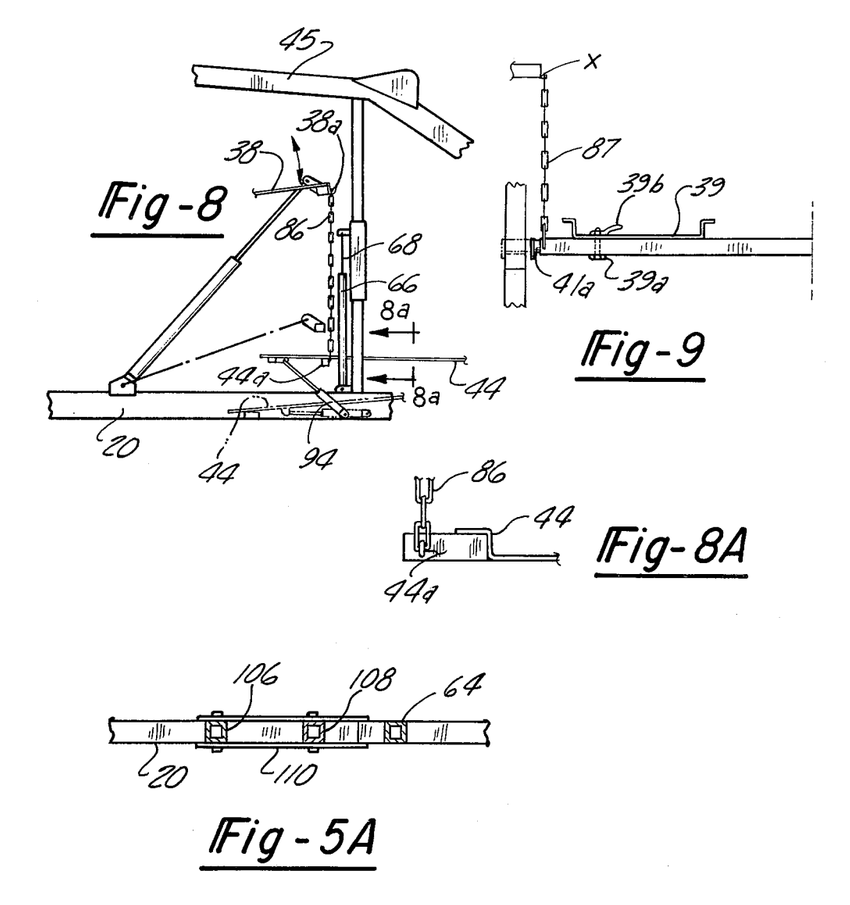
FIG. 5A is an upper plan view with parts broken away and taken along the line 5A—5A of FIG. 5.
FIG. 8 is a partial side elevational view illustrating a chain connection between one intermediate and one lower track.
FIG. 8A is a partial side view of the mechanism shown in FIG. 8 to clarify the connection of the chain and the lower track.
FIG. 9 is an end view of a removable track, such as track 39, showed in the loading of FIG. 10.

FIG. 5A is a further top view clarifying the mode of construction of the bracket 110 and of the links 106 and 108 pivotably mounted therein.

Figures 6, 7:
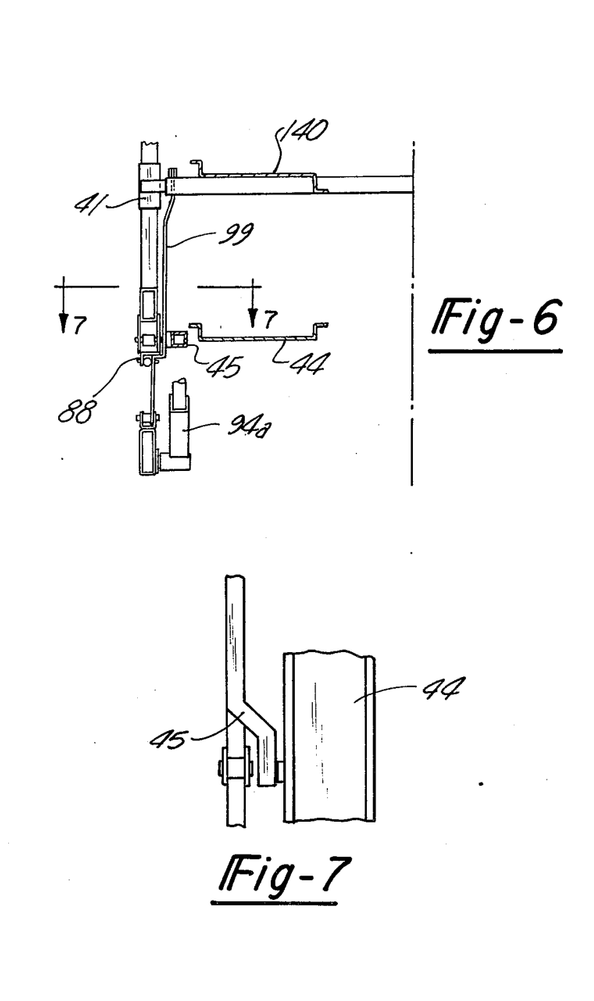
FIG. 6 is a partial vertical sectional view showing the mode of construction of the track and elevating mechanism and taken along the line 6—6 of FIG. 1.
FIG. 7 is an upper plan view taken along the section line 7—7 of FIG. 6 to further illustrate the detail of construction of the intermediate track and associated mechanism.

FIG. 6 is a sectional view taken along the line 6—6 of FIG. 1 to illustrate the mode of operation of the intermediate track 140 and the lower track 44 which is pivotably mounted to the bed of the trailer 12. It will be seen that the track 140 has its ends slidably supported in a member 41a at each end thereof. The movement of the track 140 is controlled by the cylinder 88 as previously shown in FIG. 1. The rearward lowermost track 44 mounted in the bed of the trailer 12 is likewise shown as it is connected to the hydraulic actuating cylinder 96.

FIG. 7 shows the manner in which the track 44 is supported by an inwardly bent arm 45 in such manner that its upward and downward movement is contained within the limits of the allowable maximum width for the trailer.

Figure 10:
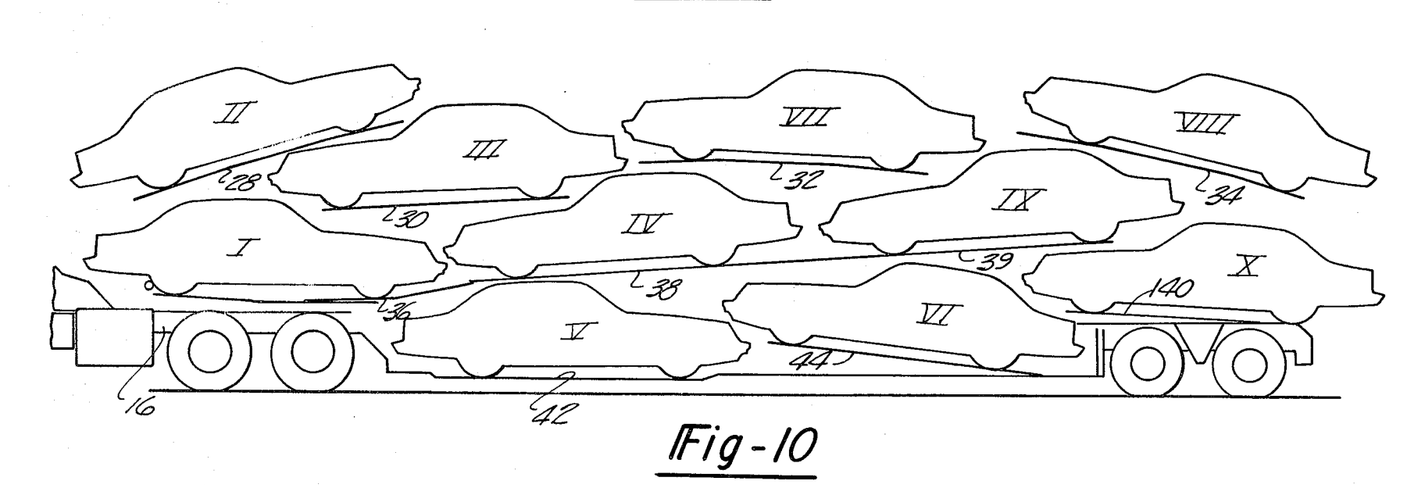
FIG. 10 shows a load of ten sub-compact cars.

FIGS. 8 and 8A are views illustrating the manner in which the chain 86 is connected between the rearward end of the intermediate track 38, namely on a hook 38a, and a further hook 44a attached proximate the forward end of the lower track 44 in such manner as to raise and hold it in a selectively elevated position to allow for movement of cars and for their storage intermediate the two tracks, for example, as is shown in FIG. 10.

FIG. 9 is a further view clarifying the manner in which an extensible track section 39 is connected, particularly according to the embodiment of FIG. 10, to further extend the accommodation of loading additional vehicles in accordance with the teaching of the present invention. In FIG. 8, the parts are shown as they would be maintained in the upper position to allow for the clearance of a lower vehicle driven between tracks 38 and 44. In the FIG. 9 showing, there is likewise included a lower bolt 39a and an upper nut with handle 39b which allow for selective connection and mounting and dismounting of the track 39 as it may be required to provide the different loadings shown in the several Figures from FIGS. 10 through 17. It will be understood that where required different track interconnecting chains, such as chain 87, will be included as between the respective upper, intermediate and lower tracks to permit for selective spacing and loaded condition maintaining. A telescoping end 41a is included at each end of the cross member supporting track 39 to allow lowering the track 39 inside the side frame members of the trailer.

DESCRIPTION OF MIXED VEHICLE LOADINGS

Reference is now made to the FIG. 10 drawing and a description will be given for the loading pattern by which ten subcompacts may be loaded on the trailer 12. In advance it is necessary that the terminology used with respect to the various types of vehicles be clarified, and accordingly the following is a listing of representative vehicles with their appropriate height and length in inches for each different type vehicle. This classification according to length and height is by way of example only and not to be considered limiting with respect to the invention:

|  | HEIGHT (Inches) | LENGTH (Inches) |
| --- | --- | --- |
| PICK-UP TRUCK | 73 | 216 |
| SUBURBAN PANEL TRUCK | 72 | 224 |
| FULL SIZE SEDAN | 58 | 231.5 |
| FULL SIZE STATION WAGON | 59 | 231.5 |
| INTERMEDIATE CAR | 58 | 218 |
| INTERMEDIATE STATION WAGON | 59 | 220 |
| COMPACT CAR | 55 | 200.5 |
| SUB-COMPACT CAR | 54 | 180 |
| VAN | 83 | 208 |

When the various terms, such as intermediate car, full size sedan, sub-compact car and the like are hereinafter used, it will be understood that they relate to vehicles having the general sizing ranges above indicated. In each case, where a particular loading is shown and described it will be understood that a like arrangement may be made of vehicles of lesser but included height and length dimension than shown in the table above.

Now again with more particular reference to FIG. 10, the sequence in which the several vehicles are loaded is indicated by Roman numerals on each. Initially, the upper tracks 28, 30, 32 and 34 are raised to their uppermost position and also the intermediate track 36 is pivoted to its lowermost position. The intermediate track 38 and the lower rear track 39 are placed in their lowered position. A jumper track, such as track 74 in FIG. 1, is installed between the track 36 and the intermediate track 38. It is then possible to load car I. Jumper track 74 is then removed. Track 30 is placed in its lowermost position, front and rear. The rear of track 28 is lowered down to the top of track 30. A jumper track is then provided at the rear of track 30 and the rear of track 28. The front of track 38 is aligned with the rear of track 30. The rear of track 38 is moved along with track 39 into a rearwardly inclined position. Then car II is backed on. The jumper track between tracks 28 and 30 is removed and the rear of track 28 is raised up while the front of track 28 is lowered down.

Next, car III is driven onto track 30. The rear of track 30 is raised up to allow clearance for car IV. Car IV is then driven on. Tracks 38 and 39 are then lifted slightly to provide clearance to drive on cars V and VI, but still allowing head clearance with respect to car III. Car V is then backed on. The rear of track 38 is lowered down and the front of track 44 is picked up through a chain. Car VI is then driven on. The rear of track 44 is next lowered down.

The loading skids are removed from the top of the wheel housing to the rear of track 34. The front of track 34 is aligned with the rear of track 32. A short jumper skid is then installed between these tracks. Car VII is then driven on. The jumper skid between tracks 32 and 34 is removed. Car VIII is then driven on.

The front of track 140 is raised to an intermediate position. The rear of track 39 is lowered down through a chain connected to the front of track 34. Car IX is driven on. Then the front of track 34 is raised up, lifting the rear of track 39 to a final resting place on the side frame of the trailer in the manner illustrated in FIG. 9. The front of track 140 is lowered down and the flipper plate 140a is swung forwardly. Car X is then driven on and the loading skid to ground is removed. The height of the several tracks is then adjusted to maintain the height limit for over-the-highway hauling.

Figure 11:
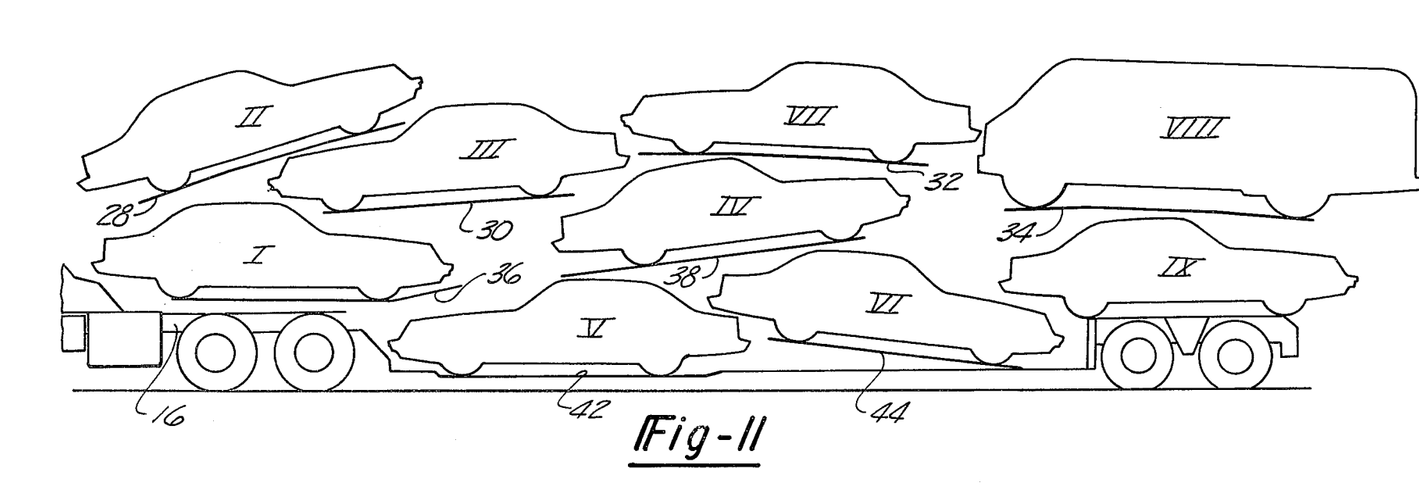
FIG. 11 shows a mixed load of eight sub-compact cars and one van.

The loading sequence and procedure for FIG. 11 will now be described. The loading procedure for cars I, II and III is the same as just described for FIG. 10 except that track 39 has been removed and stored within the trailer. The track 40, as best shown in FIG. 16, is raised to span the space between the rear of track 38 and the front of the wheel housing. Car IV can then be backed into position. Track 38 is then overlifted. Short track 40 is lowered down at its front and allowed to rest on track 44. Then car V is driven on. The rear of track 38 is lowered down and the front of track 44 is picked up through a chain. Car VI is then backed on. The rear of track 44 is lowered down. The loading skid is moved to the rear of track 34. A short jumper skid is installed between the front of track 34 and the rear of track 32. Car VII is then driven on. The short jumper skid between the rear of track 32 and the front of track 34 is then removed. Next, the van VIII is driven into position. The loading skid is lowered to the top of the wheel housing. Car IX is then backed on and the loading skids removed. The several tracks are then suitably adjusted for height.

Figure 12:
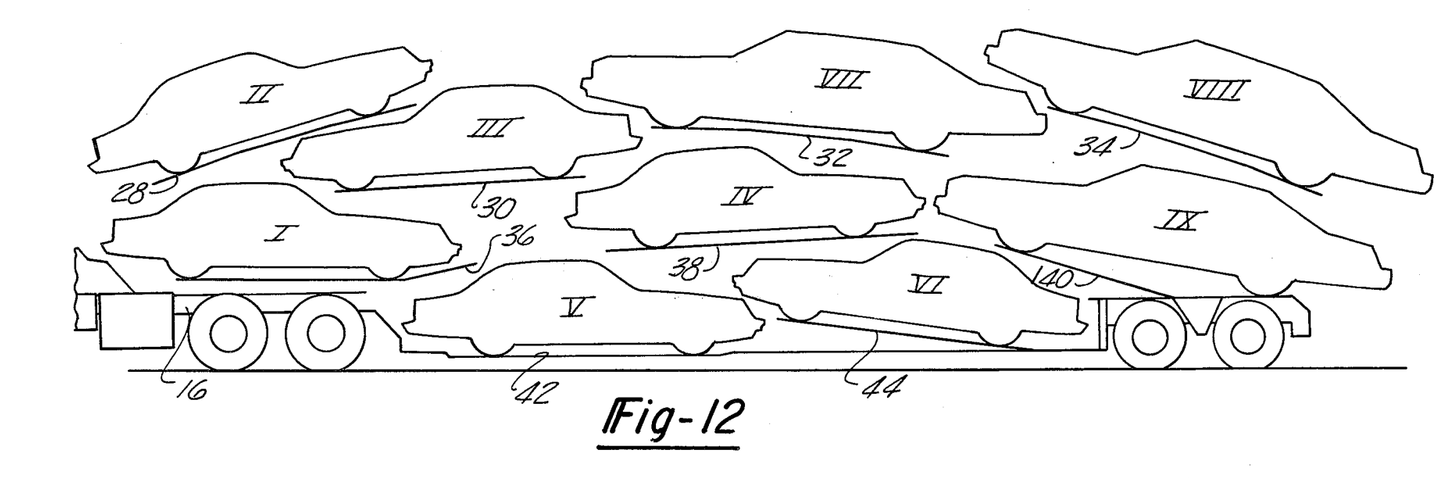
FIG. 12 shows a mixed load of six sub-compact cars and three full size cars.

FIG. 12 has its cars I through VI loaded in the same manner just described in connection with FIG. 11. The loading skids are placed against the rear of track 34 with a short jumper skid between the rear of track 32 and the front of track 34. Car VII is then driven into place. The rear of track 32 is lowered to allow car VIII to overlap the trunk of car VII. Car VIII is then driven on. The loading skids are then lowered into position on the trailer wheel housing. Track 34 is then raised at its front and rear. Track 140 is lifted and slides forward to rest on support 41 as shown in FIG. 1. Car IX is then driven on into place. Suitable height adjustment of the tracks is then made.

Figure 13:
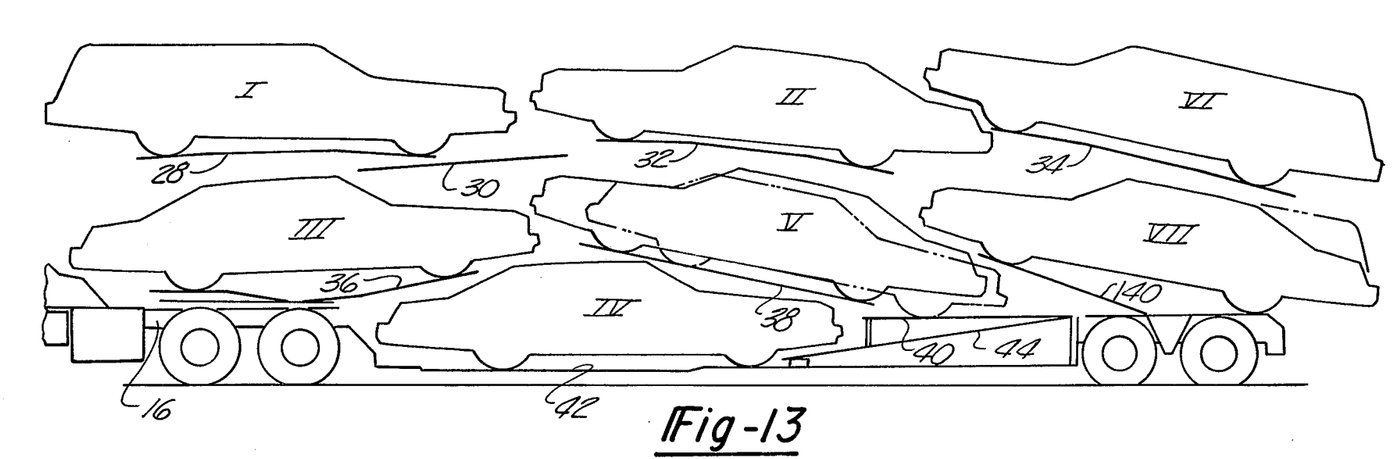
FIG. 13 shows a mixed load of three station wagons and four full size sedans.

The FIG. 13 loading is started by longitudinally aligning the tracks 28, 30 and 32. The front of track 34 is lined up with the rear of track 32. The rear of track 34 is lowered all the way. A short jumper track is installed between the rear of track 30 and the front of track 32. Another short jumper track is installed between the rear of track 32 and the front of track 34. Loading skids are placed against the rear of track 34. Station wagon I is backed into position. The short jumper tracks between tracks 28 and 30 are removed. Car II is then driven on. The short jumper skid between the rear of track 32 and the front of track 34 is then removed. The loading skid is then lowered to the top of the wheel housing. Track 36 is placed in its lowermost position. Track 40 is raised into its stand. The rear of track 44 is raised to its uppermost position in line with the wheel housing and the front is in its lowermost position. Track 38 is aligned with the rear of track 36 and the front of track 40. A short jumper skid is installed between the rear of track 36 and the front of track 38. Car III is then backed on. The jumper skid between tracks 36 and 38 is then removed. Then track 38 is overlifted and the front of track 40 is lowered down flat against track 44. Car IV is then backed on.

The front of track 40 is placed on its stand. The rear of track 38 is lowered and the front is lowered slightly. Car V can be driven on with all its wheels resting on track 38. Alternately, car V can be backed on with its rear wheels resting on track 38 and its front wheels resting on track 40. The rear of track 32 is lowered to allow car VI to overlap the rear of car II. Car VI is then driven on. The loading skids are then lowered to the top of the wheel housing. Track 34 is then raised at its front and rear. Track 140 is lifted and slides forward to rest on support 41. Car VII is then driven on. The loading skids are removed and the several tracks are suitably adjusted for height.

Figure 14:
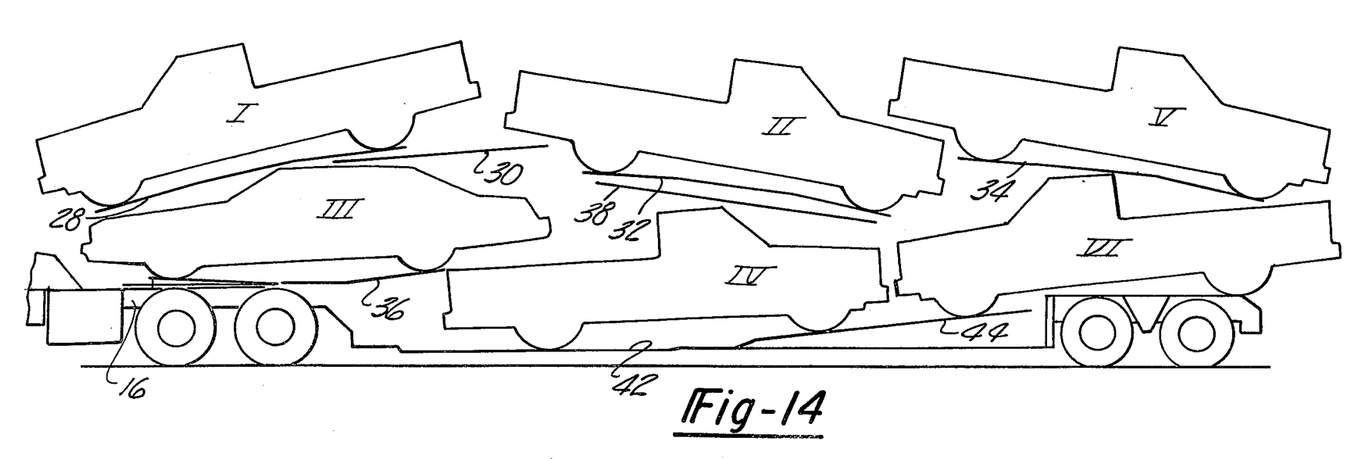
FIG. 14 shows a mixed load of five pick-up trucks and one intermediate size sedan.

In the loading of FIG. 14, vehicles I through IV are loaded in the same manner as just described for FIG. 13. Track 38 is adjusted over the top of vehicle IV into an inactive position. The rear of track 32 is then lowered to allow vehicle V to overlap the front of vehicle II. The loading skid is raised to the rear of track 34. Vehicle V is then backed on and overlifted to allow clearance for vehicle VI. Loading skids are lowered to the top of the wheel housing and vehicle VI is driven on. The rear of track 44 is then lowered down to an intermediate position to allow for the height adjustment of vehicle V within the legal height limits. Skids are removed and the several track height adjustments are completed.

In FIG. 15, the loading procedure for vehicles I through IV is the same as described for FIG. 14. The rear of track 44 is in line with the top of the wheel housing. A chain is connected between the rear of track 38 and the front of track 44. Track 38 then is used to pick up track 44 and align it with the top of the wheel housing. Vehicle V is then backed into place. The rear of track 44 is then lowered down. Loading skids are moved to the rear of track 34 and vehicle VI is driven on. The loading skids are then moved to the top of the wheel housing. The flipper 140a is flipped forwardly to give additional track running surface for vehicle VII which is then backed on. Loading skids are removed and track height adjustment is completed.

In FIG. 16, the loading procedure is substantially the same as described in connection with FIG. 13. A minor difference is that the front wheels of car VII rests on track 40 so that cars VI and VII do not overlap.

Figure 17:
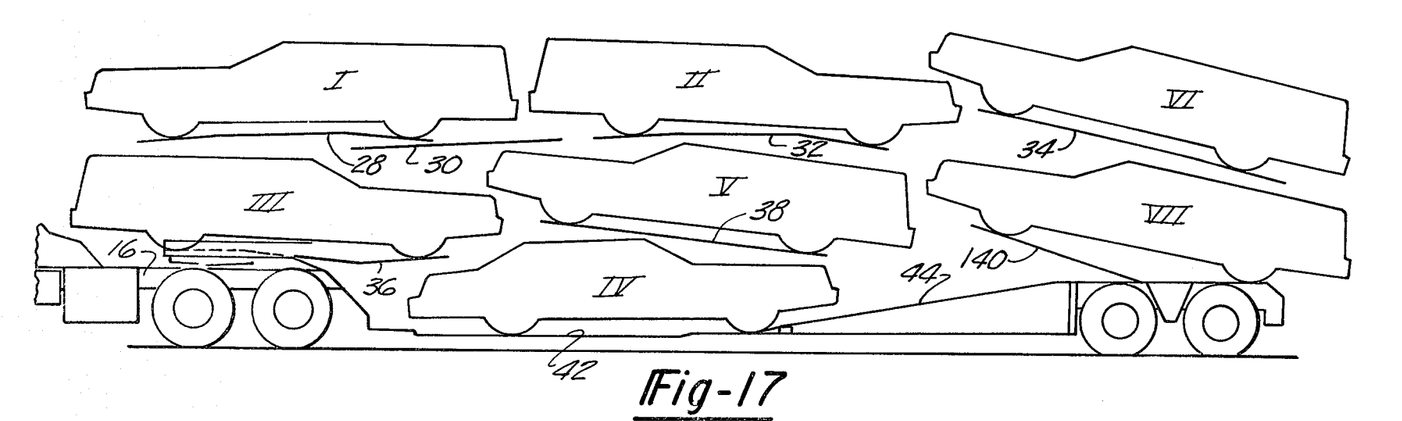
FIG. 17 shows a mixed load of six intermediate size station wagons and one intermediate size car.

The loading of FIG. 17 likewise is loaded in a manner substantially the same as described in FIG. 13.

It will thus be seen that I have provided by my invention a new and improved vehicle transport system which is characterized by its versatility and ability to handle a broad mix of standard vehicles, both passenger and commercial, that are not allowed by the prior art transport trailers.

What is claimed is:

1. A tractor and a vehicle transport trailer for transporting ten vehicles of the sub-compact type thereon, said trailer having
   four upper vehicle supporting tracks longitudinally arrayed along the length of said trailer;
   three intermediate vehicle supporting tracks further aligned longitudinally along the length of said trailer;
   a pair of lower tracks, one fixed and one pivotably mounted on said trailer;
   a further rearward lower pivotal track intermediate said first mentioned lower track pair;
   the forwardmost of said upper tracks being slanted forwardly and operable to support a rearwardly facing sub-compact car, the remaining three of the upper tracks each being successively slanted more rearwardly and operable to support a forward facing sub-compact car, the forwardmost of the intermediate tracks being substantially horizontal and operable to support a rearward facing sub-compact car, the rearward two intermediate tracks each being slanted forwardly and operable to support a different forward facing subcompact car, the forwardmost of the lower tracks being substantially horizontal and operable to support a rearward facing subcompact car, and the remaining lower tracks each slanted rearwardly and operable to support a different forward facing sub-compact car 2. A tractor and a vehicle transport trailer for transporting eight sub-compact cars and one van thereon, said trailer having
   four upper vehicle supporting tracks longitudinally arrayed along the length of said trailer;
   three intermediate vehicle supporting tracks further aligned longitudinally along the length of said trailer; and
   a pair of lower tracks, one fixed and one pivotably mounted on the trailer;
   the forwardmost of said upper tracks slanted forwardly and operable to support a rearwardly facing sub-compact car, the next two of the upper vehicle supporting tracks slanted forwardly and substantially level, respectively, and each operable to support a different forward facing sub-compact car; the rearwardmost of the upper tracks is substantially horizontal and operable to support a forward facing van; the forwardmost of the intermediate vehicle carrying tracks substantially level and operable to support a rearward facing sub-compact car, the second of the intermediate vehicle carrying tracks slanted forwardly and operable to support a rearward facing sub-compact car; and the third of the intermediate vehicle carrying tracks substantially horizontal and operable to support a rearward facing sub-compact car; the forwardmost of the lower tracks being substantially horizontal and operable to support a forward facing sub-compact car; and the rearwardmost of the lower tracks slanted rearwardly and operable to support a rearward facing sub-compact car.

3. A tractor and a vehicle transport trailer for transporting six vehicles of the sub-compact type and three full size sedans, said trailer having
   four upper vehicle supporting tracks longitudinally arrayed along the length of said trailer;
   three intermediate vehicle supporting tracks further aligned longitudinally along the length of said trailer;
   a pair of lower tracks, one fixed and one pivotably mounted on said trailer; and
   means operatively connected to each of the upper vehicle supporting tracks for moving it vertically upwardly and downwardly and pivotably about both ends thereof;
   the forwardmost of said upper tracks slanted forwardly and operable to support a rearward facing sub-compact car, the second of said upper vehicle supporting tracks slanted forwardly and operable to support a forward facing sub-compact car, and the rearwardmost two of the upper tracks each slanted rearwardly and operable to support a different forward facing full size sedan; the forward first and second of the intermediate tracks being substantially horizontal and slanted forwardly, respectively, and each operable to support a rearward facing sub-compact car, the rearward of the intermediate vehicle supporting tracks slanted rearwardly and operable to support a forward facing full size sedan, the forward lower vehicle supporting track being substantially horizontal and operable to support a rearward facing sub-compact car and the rearward lower track slanted rearwardly and operable to support a forward facing sub-compact car.

4. A tractor and a vehicle transport trailer for transporting two vans, one full size station wagon, one full size car and three sub-compact cars thereon, said trailer having
   four upper vehicle supporting tracks longitudinally arrayed along the length of said trailer;
   two intermediate vehicle supporting tracks further aligned longitudinally along the length of said trailer; and
   a pair of lower tracks, one fixed and the second rearwardmost pivotably mounted on said trailer;
   the first of said upper vehicle supporting tracks slanted rearwardly and operable to support a rearward facing full size station wagon, the second forwardmost upper vehicle supporting track used to bridge in a loading position the first and third upper vehicle supporting tracks, the third of said upper vehicle supporting tracks being substantially horizontal and operable to support a rearward facing van, the fourth of said upper vehicle supporting tracks being substantially horizontal and operable to support a forward facing van, the forwardmost of said intermediate vehicle supporting tracks being operable to support a rearward facing standard size car, the rearwardmost of said intermediate tracks being operable to support a sub-compact car oriented in a rearwardly facing position, and the two lower tracks each operable to support a different forward and rearward facing sub-compact car.

5. A tractor and a vehicle transport trailer for transporting three half-ton pick-up trucks and four intermediate cars, said trailer having
   four upper vehicle supporting tracks longitudinally arrayed along the length of said trailer;
   three intermediate vehicle supporting tracks further aligned longitudinally along the length of said trailer; and
   a pair of lower tracks, one fixed and one pivotably mounted to the bed of said trailer for supporting a further pair of vehicles;

the upper forwardmost of said tracks slanted forwardly and operable to support a forward facing pick-up truck and the rearward two of the upper tracks each slanted rearwardly and operable to support a different rearward facing pick-up truck; the three intermediate tracks being each operable to support a different forward facing intermediate car and the forwardmost of said tracks being operable to support a rearward facing intermediate car.

6. A tractor and a vehicle transport trailer for transporting six intermediate station wagons and one intermediate car, said trailer having a bed and having
   four upper vehicle supporting tracks longitudinally arrayed along the length of said trailer;
   three intermediate vehicle supporting tracks further aligned longitudinally along the length of said trailer;
   a lower track fixed to the bed of said trailer; and
   a further lower track for loading a vehicle on said lower track, said last mentioned track being inclined in a forward direction for accomplishing said loading;
   the first of said upper tracks being substantially horizontal and operable to support a forward facing intermediate station wagon; the next to the last of said upper tracks being substantially horizontal and operable to support a rearward facing intermediate station wagon; the rearwardmost of said upper tracks slanted rearwardly and operable to support a forward facing intermediate station wagon; the forwardmost of said intermediate tracks being substantially horizontal and operable to support a rearward facing intermediate station wagon; the second and third intermediate tracks each being slanted rearwardly and operable to support a different forward facing intermediate station wagon; and the lowermost of said tracks being substantially horizontal and operable to support a rearward facing intermediate car.

7. A vehicle transport trailer for carrying a plurality of vehicles, said trailer comprising:
   four upper vehicle supporting tracks longitudinally arrayed along the length of said trailer;
   lifting means operatively connected to the forward and rearward ends of the forwardmost of said upper tracks for lifting and expanding it forwardly to a loaded position, the rearwardmost of said tracks further having lifting means operatively connected to its forward and rearward ends for lifting and expanding it rearwardly in the loaded position thereof;
   means operatively connected to the two intermediate tracks for lifting such tracks to a loaded position;
   three intermediate vehicle supporting tracks further aligned longitudinally along the length of said trailer;
   means operably connected to the respective forward and rearward ends of said intermediate tracks for lifting them to a loaded position;
   a pair of lower tracks, the forward one fixed and the other one pivotally mounted at its rearward end in the bed of said trailer;
   lifting means operately connected to the forward end of said pivotally mounted lower track for elevating it to a loaded position; and
   a further lower pivotal track intermediate said lower pair of tracks, said last mentioned track likewise having lifting means operably connected to its forward end for lifting it to a loaded position.

8. The combination as set forth in claim 7 wherein said lifting means comprises in each case a fluid operated cylinder operably extendable to provide the different positions of said respective tracks.

9. The combination as set forth in claim 7 wherein said means for lifting said forwardmost and said rearwardmost of said upper tracks comprises in each case an extensible hydraulic cylinder and rod for moving the respective tracks toward and away from their loaded positions.

10. The combination as set forth in claim 7 wherein said means for lifting said respective tracks comprise in each case a pair of transaxially oriented extensible hydraulic cylinders for providing the required motion of such tracks.

11. A vehicle transport trailer for carrying a plurality of vehicles, said trailer comprising:
    four upper vehicle supporting tracks longitudinally arrayed along the length of said trailer;
    lifting means operatively connected to the forward and rearward ends of the forwardmost of said upper tracks for lifting and expanding it forwardly to a loaded position, the rearwardmost of said tracks further having lifting means operatively connected to its forward and rearward ends for lifting and expanding it rearwardly in the loaded position thereof;
    means operatively connected to the two intermediate tracks for lifting such tracks to a loaded position;
    three intermediate vehicle supporting tracks further aligned longitudinally along the length of said trailer;
    means operably connected to the respective forward and rearward ends of said intermediate tracks for lifting them to a loaded position;
    a pair of lower tracks, the forward one fixed and the other one pivotally mounted at its rearward end in the bed of said trailer; and
    lifting means operatively connected to the forward end of said pivotally mounted lower track for elevating it to a loaded position.

* * * * *